2,987,617

APPARATUS FOR CONVERTING A VESTIGIAL-SIDE-BAND CARRIER TO A DOUBLE-SIDE-BAND CARRIER

Bernard D. Loughlin, Huntington, N.Y., assignor to Hazeltine Research, Inc., Chicago, Ill., a corporation of Illinois Filed Oct. 19, 1956, Ser. No. 617,042
16 Claims. (Cl. 250—20)

Figure 1:
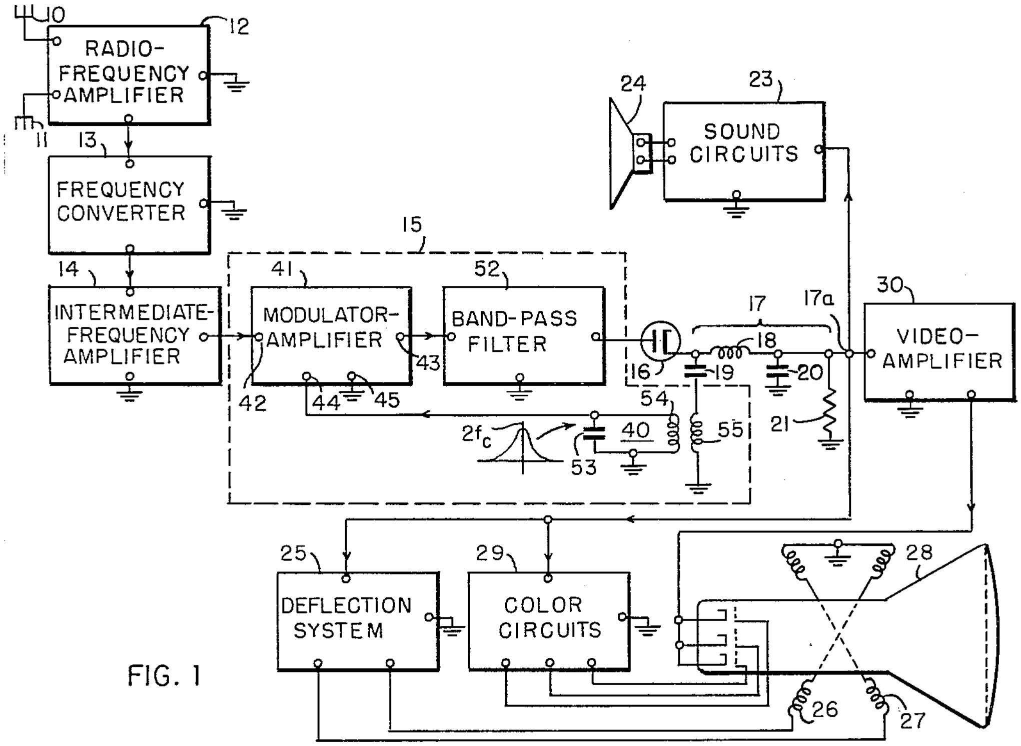

This invention relates to apparatus for converting a vestigial-side band amplitude-modulated carrier signal into a complete wide band double-side-band amplitude-modulated carrier signal. In particular, the invention relates to receiver apparatus for minimizing signal distortion which otherwise occurs when detecting a vestigial-side-band amplitude-modulated carrier signal.

In communication systems, it is frequently desirable to conserve spectrum band width by transmitting the signal information in a vestigial-side-band manner. When a vestigial-side-band signal is detected by means of an envelope detector at the receiver, however, undesired quadrature components are also developed because of the single-side-band nature of a portion of such vestigial-side-band signal. These undesired quadrature components frequently produce noticeable distortion in the reproduced signal information.

A good example of a vestigial-side-band communication system is a television system, either color or monochrome, of the type which is presently being utilized in the United States. In such a television system, the monochrome-signal information is transmitted by means of a negative modulation technique, that is, the lower modulation levels correspond to white while higher modulation levels correspond to black. A a result, the quadrature components, which cause an apparent increase in the carrier level, tend to suppress the luminance or monochrome component of the reproduced image. This phenomenon is particularly objectionable in the case of color television where additional extraneous beat notes are frequently present. For example, a 920-kilocycle beat note between the sound carrier and color subcarrier is generally present and results in a 920-kilocycle quadrature component which, in turn, causes a corresponding luminance suppression pattern in the reproduced image which is both noticeable and objectionable.

It would be desirable, therefore, to have some form of relatively inexpensive apparatus for converting the received vestigial-side-band signal into a complete wide band double-side-band signal. Then the subsequent envelope detection of the complete signal would produce a minimum of quadrature components, thereby eliminating the undesired effects in the reproduced image.

It is an object of the invention, therefore, to provide new and improved apparatus of relatively simple and inexpensive construction for converting a vestigial-side-band amplitude-modulated carrier signal into a complete wide band double-side-band amplitude-modulated carrier signal.

It is another object of the invention to provide new and improved receiver apparatus for minimizing the signal distortion which otherwise occurs when detecting a vestigial-side-band amplitude-modulated carrier signal.

In accordance with the invention, apparatus for converting a vestigial-side-band amplitude-modulated carrier signal into a double-side-band amplitude-modulated carrier signal comprises circuit means responsive to the double-side-band portion of the amplitude-modulated carrier signal for deriving a signal having a phase representative of a carrier phase. The apparatus also includes circuit means for translating the amplitude-modulated carrier signal and responsive to the derived signal for controlling the translation of at least the single-side-band portion of the amplitude-modulated carrier signal for producing mating side bands for the single-side-band portion to give substantially a complete double-side-band amplitude-modulated carrier signal.

For a better understanding of the present invention, together with other and further objects thereof, reference is had to the following description taken in connection with the accompanying drawings, and its scope will be pointed out in the appended claims.

Figure 2A:
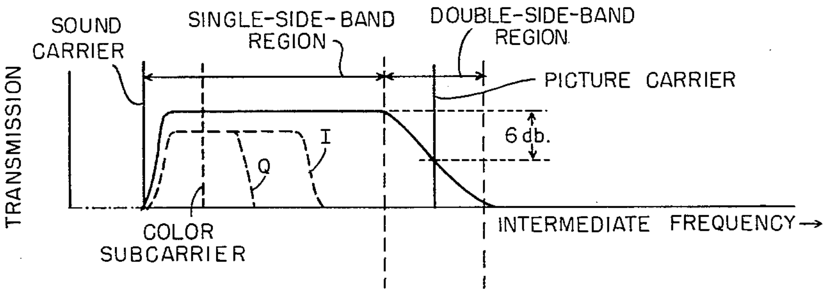
Figure 2B:
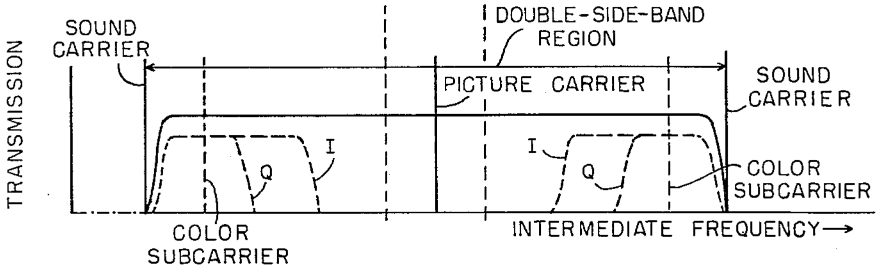
Figure 3A:
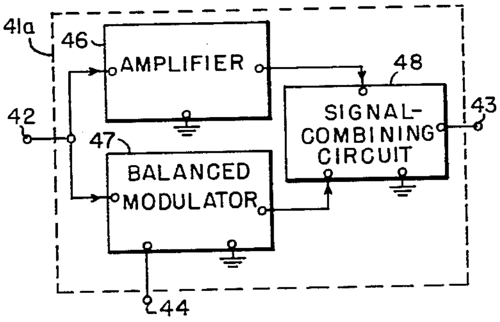
Figure 3B:
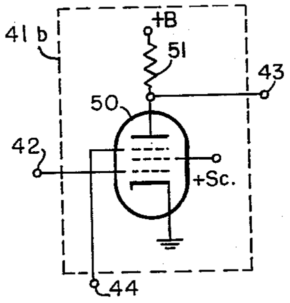
Figure 4A:
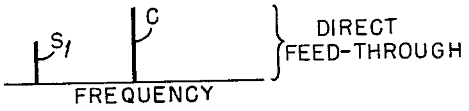
Figure 4B:
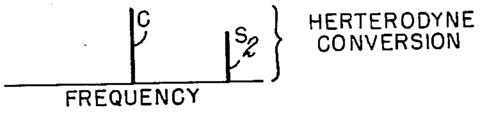
Figure 6:
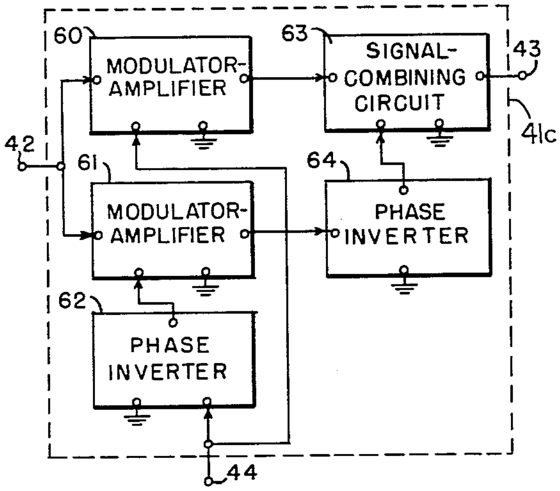
Figure 7A:
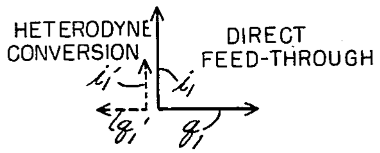
Figure 7B:
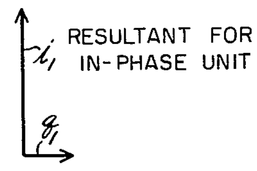
Figure 7C:
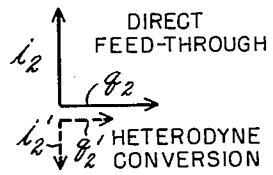
Figure 7D:
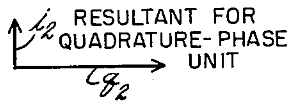
Figure 7E:
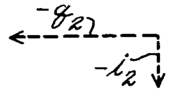
Figure 8:
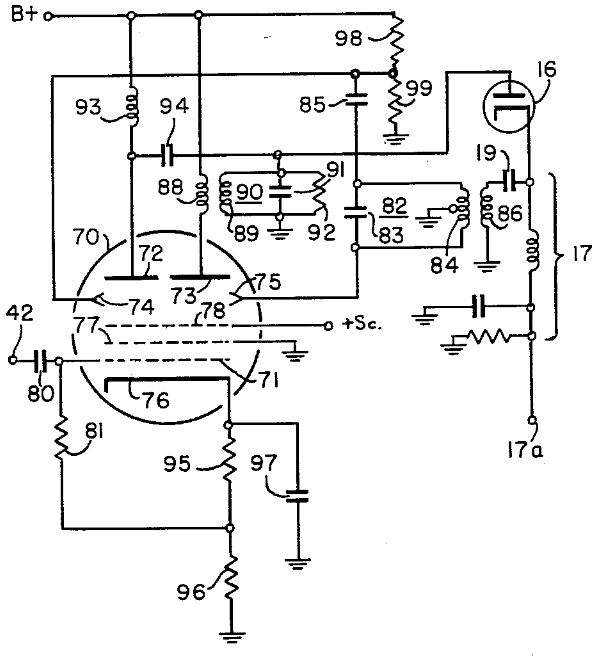

Referring to the drawings:

FIG. 1 is a circuit diagram, partly schematic, of a representative embodiment of a color-television receiver including a representative embodiment of signal-converting apparatus constructed in accordance with the present invention;

FIGS. 2*a* and 2*b* are frequency spectrum diagrams used in explaining the operation of the invention;

FIGS. 3*a* and 3*b* are representative embodiments of circuit apparatus that may be used in the signal-converting apparatus of the present invention;

FIGS. 4*a* and 4*b* are frequency spectrum diagrams used in explaining the operation of the invention;

FIGS. 5*a*–5*d*, inclusive, are vector diagrams used in explaining the operation of the signal-converting apparatus of FIG. 1;

FIG. 6 is a diagram of further circuit apparatus that may be used in the signal-converting apparatus of FIG. 1;

FIGS. 7*a*–7*f*, inclusive, are vector diagrams used in explaining the operation of the apparatus of FIG. 6, and FIG. 8 is a circuit diagram of a further embodiment of signal-converting apparatus constructed in accordance with the present invention.

FIG. 1 TELEVISION RECEIVER

Referring now to FIG. 1 of the drawings, a representative embodiment of signal-converting apparatus constructed in accordance with the present invention is shown in the representative environment of a color-television receiver. Though a color-television receiver is used to illustrate a typical vestigial-side-band communication system, it will be readily apparent that the invention is equally useful in other forms of vestigial-side-band communication systems. Considering in detail the operation of the color-television receiver of FIG. 1, the composite color-television signal transmitted by a remote transmitting station is intercepted by an antenna system 10, 11 and supplied thereby to a radio-frequency amplifier 12 which serves to amplify the received signal. This amplified signal is, in turn, supplied to a frequency converter 13 which may contain the usual oscillator and modulator circuits for converting the radio-frequency carrier into an intermediate-frequency carrier. The intermediate-frequency carrier is then amplified by an intermediate-frequency amplifier 14 and then supplied to signal-converting apparatus 15 which is constructed in accordance with the present invention.

The signal-converting apparatus 15 will be considered more in detail hereinafter but the general purpose thereof may be briefly considered by referring to FIGS. 2*a* and 2*b* of the drawings. FIG. 2*a* shows the signal spectrum at the output of the intermediate-frequency amplifier 14 and, in particular, indicates the double-side-band region which extends to about 0.75 megacycle on either side of the picture carrier. As indicated, the single-side-band region of the amplitude-modulated carrier occupies the remainder of the signal spectrum out to the sound carrier, which is 4.5 megacycles removed from the picture carrier. Also shown are the frequency-interleaved I and Q color subcarrier components. It will be noted that the frequency pass band of the intermediate-frequency amplifier 14 is such that the picture carrier falls on a slope of the frequency characteristic at one end thereof. In other words, the picture carrier is placed 6 decibels down on the slope of the curve in order to equalize the double-side-band and single-side-band signal amplitudes.

FIG. 2*b* shows the frequency spectrum curve at the output of the signal-converting apparatus 15 of the present invention. Such apparatus is effective to regenerate the missing side-band components of the vestigial-side-band carrier signal of FIG. 2*a* so that a complete wide band double-side-band carrier signal, as indicated by the frequency spectrum curve of FIG. 2*b*, is produced. This complete double-side-band carrier signal is then supplied to an envelope detector which is represented, for example, by a diode 16 and an associated low-pass filter 17. The filter 17 may include, for example, a radio-frequency choke 18, by-pass condensers 19 and 20, and a load resistor 21. Thus, at the output terminal 17*a* of the filter 17 there appears the detected video-frequency modulation components of the carrier signal with a minimum of quadrature distortion.

The sound components of the composite video signal at the output terminal 17*a* are then selected and processed by the usual sound circuits 23 and then supplied to a loudspeaker 24 for reproducing the desired sound. The scanning synchronizing components are selected by a deflection system 25 which is controlled thereby to produce properly synchronized line-scan and field-scan deflection currents which, in turn, are supplied to deflection windings 26 and 27 associated with a color-image-reproducing device or picture tube 28. The picture tube 28 may, for example, take the form of a conventional three-gun shadow-mask tube. The deflection windings 26 and 27, when energized by the scanning currents, are effective to cause the electron beam within the picture tube 28 to scan the phosphor screen thereof in the usual raster pattern. The deflection system 25 may be of conventional construction and may include the usual sync-separating circuits, a horizontal scanning oscillator, a vertical scanning oscillator, and the accompanying amplifier circuits.

The color subcarrier components of the composite video signal appearing at the output terminal 17*a* are selected by the color circuits 29 and processed thereby to produce, for example, red, green, and blue color-difference signals which are supplied to the corresponding control electrodes of the picture tube 28. The color circuits 29 may include conventional synchronous detector circuits, matrix circuits, and local oscillator and burst-synchronizing signals for actuating the synchronous detector circuits. The monochrome components of the composite video signal are selected and amplified by a video amplifier 30 and then supplied, for example, to the cathodes of the picture tube 28 for further modulating the electron beams in accordance with the monochrome or luminance component of the reproduced image. It will be noted that the color receiver of FIG. 1 differs from a monochrome receiver only in the use of the color circuits 29 and in the use of a three-gun color picture tube 28 instead of a one-gun black-and-white picture tube.

*Description of signal-converting apparatus of FIG. 1*

Considering now the signal-converting apparatus 15 of FIG. 1 in more detail, such apparatus constitutes a representative embodiment of apparatus constructed in accordance with the present invention for converting a vestigial-side-band amplitude-modulated carrier signal into a double-side-band amplitude-modulated carrier signal. Where the invention is used in a communication receiver, such as the color-television receiver of FIG. 1, the signal-converting apparatus together with the pertinent receiver components represents receiver apparatus for detecting a vestigial-side-band amplitude-modulated carrier signal with a minimum of signal distortion.

Considering the matter in more detail, the invention may include circuit means for supplying a vestigial-side-band amplitude-modulated carrier signal. Such supply circuit means may comprise, for example, the initial units 12–14, inclusive, of the television receiver of FIG. 1. In particular, the intermediate-frequency amplifier 14, in addition to amplifying the intermediate-frequency vestigial-side-band carrier signal, also preferably has a pass-band characteristic such that the frequency of the intermediate-frequency carrier falls on a slope of the characteristic at one end thereof.

The invention also includes the signal-converting apparatus 15 for converting the vestigial-side-band intermediate-frequency carrier into a double-side-band intermediate-frequency carrier. Such signal-converting apparatus 15 may include circuit means responsive to the double-side-band portion of the amplitude-modulated carrier signal for deriving a signal having a phase representative of the carrier phase. Such signal-deriving circuit means may take the form of a tuned circuit 40 which will be discussed in greater detail hereinafter.

The signal-converting apparatus 15 also includes circuit means for translating the amplitude-modulated carrier signal and responsive to said derived signal for controlling the translation of at least the single-side-band portion of the amplitude-modulated carrier signal for producing mating side bands for the single-side-band portion to give substantially a complete double-side-band amplitude-modulated carrier signal. This circuit means may comprise a modulator-amplifier 41 for directly translating and for heterodyning the amplitude-modulated carrier signal with the locally derived signal for developing, in addition to the original signal components, heterodyne components representing the missing side-band components of the amplitude-modulated carrier signal. The modulator-amplifier 41 includes an input terminal 42, an output terminal 43, and a second input terminal 44 to which is supplied the locally derived signal. There is also included a terminal 45 represented, for example, by ground which is common to all three of the terminals 42, 43, and 44. The modulator-amplifier 41 must be capable of simultaneously performing the functions of directly translating (the amplifier aspect) and of heterodyning (the modulator aspect) portions of the carrier signal supplied to the input terminal 42. Modulator-amplifiers, per se, are well known in the art and, in fact, most so-called "modulators" are known to perform these dual functions, though the direct translation aspect is frequently undesired and no use is made thereof. For purposes of completeness of description, however, modulator-amplifier 41 may, for example, take the form of either of the more detailed circuits shown in FIGS. 3*a* and 3*b*.

The modulator-amplifier circuit 41*a* of FIG. 3*a*, which may be coupled to the terminals 42, 43, and 44 of FIG. 1 as indicated, shows a shunt type or parallel channel type of apparatus including an amplifier circuit 46 connected in parallel with a balanced modulator circuit 47. The amplifier 46 serves to directly translate the amplitude-modulated carrier signal while the balanced modulator 47 serves to simultaneously heterodyne the carrier signal with the locally derived signal supplied thereto by way of terminal 44. Both the directly translated components and the heterodyne components are then combined together in a signal-combining circuit 48 which may, for example, take the form of a simple resistive adder circuit or, perhaps, a load impedance which is common to both of the units 46 and 47. Also, the pass bands of the amplifier 46 and balanced modulator 47 channels may be individually adjusted by means of suitable filters so that, for example, only the single-side-band portion of the carrier signal supplied to the input terminal 42 is translated by way of the balanced modulator 47 while substantially all of the signal is translated by way of the amplifier 46. With a balanced type modulator it will be noted thaf there is substantially no direct feedthrough of the signal components supplied to the input thereof, that is, a balanced type of modulator does not have the direct translation feature. As a result, only heterodyne components appear at the output of such a balanced modulator.

Instead of using parallel signal channels, as shown in FIG. 3*a*, a single signal channel may be used for producing both the heterodyning action and the direct feedthrough or direct translation action. In this case, the modulator-amplifier may take the form of a modulator circuit of the unbalanced type which, as is well known in the art, is characterized by the presence of some direct feedthrough. One common type of unbalanced modulator is represented by the unit 41*b* of FIG. 3*b* and takes the form of a pentode electron tube 50 wherein the input carrier signal is supplied to a control electrode thereof while the locally derived signal is supplied to the suppressor electrode thereof. In this manner, both direct feedthrough signal components and heterodyne-conversion signal components may be developed across a load resistor 51 and thereby supplied to the output terminal 43.

The signal-converting apparatus 15 of FIG. 1 also includes band-pass filter circuit means 52 coupled to the output terminal 43 of the modulator-amplifier circuit 41 for translating selected modulator-amplifier output components to provide substantially a complete double-side-band amplitude-modulated carrier signal which may be detected with a minimum of signal distortion. Such circuit means 52 may take the form of any of the conventional types of band-pass filters. The upper frequency cutoff of the filter 52 should be such that none of the higher order harmonics produced in the heterodyning process is passed thereby. In some cases, the band-pass filter 52 may take the form of a broad band tuned circuit either serving as or coupled to the load of the modulator-amplifier 41.

The invention may also include an envelope detector circuit for detecting the complete double-side-band signal thereby to provide a detected signal having a minimum of signal distortion. Such envelope detector circuit may include the diode 16 and the low-pass filter 17 coupled to the output thereof.

As mentioned, the signal-converting apparatus 15 includes circuit means represented, for example, by the tuned circuit 40 which is responsive to the double-side-band portion of the amplitude-modulated carrier signal for deriving a signal having a phase representative of the carrier phase. Such circuit means represents the circuit means for deriving the local signal which is supplied to the terminal 44 of the modulator-amplifier circuit 41 and, as represented by the tuned circuit 40, such circuit means may be a tuned circuit which is tuned to a harmonic of the intermediate-frequency carrier frequency. It is to be undertsood that the term "harmonic" includes both the fundamental or first harmonic as well as the higher order harmonics of the carrier signal. In many cases, however, circuit economy may be more readily realized by using a tuned circuit which is tuned to the second harmonic of the carrier frequency. For purposes of illustration, therefore, such tuned circuit 40 will hereinafter be assumed to be a tuned circuit which is fairly sharply tuned to the second harmonic of the intermediate-frequency carrier frequency.

The tuned circuit 40 may include a condenser 53 and an inductor 54 which are designed to be resonant at the desired frequency. As shown in FIG. 1, the inductor 54 of the tuned circuit 40 may be inductively coupled by way of a transformer winding 55 to the output terminal of the diode 16. This is a convenient place to couple the tuned circuit 40 in that the rectified signal is rich in harmonics and, therefore, readily enables a second harmonic signal to be developed. The essential feature, however, is that the tuned circuit 40 be in some manner exposed to the carrier signal and, to this end, the tuned circuit 40 might, as examples of alternatives, be coupled to either the output of the intermediate-frequency amplifier 14 or the output of the modulator-amplifier 41. Also, to enhance the circuit operation, it may be desirable to proportion the winding 55 and the condenser 19 so that they are series-resonant at the desired harmonic frequency.

*Operation of signal-converting apparatus of FIG. 1*

Consdering now the operation of the signal-converting apparatus 15 just described, such apparatus is characterized by the fact that it includes a modulator-amplifier 41 which performs two functions, namely, direct translation and heterodyne conversion. These two operations are carried out simultaneously as, for example, in either the parallel signal channels of the FIG. 3*a* apparatus or in the single signal channel of the FIG. 3*b* apparatus.

Assuming that a single sinusoidal signal is modulated onto the carrier at the transmitter and that the resulting signal is transmitted in a single-side-band manner by suppressing one of the side-band components, then the frequency spectrum of the signal resulting at the output of the intermediate-frequency amplifier 14 would show a lower side-band component $S_1$ and a carrier component C as indicated in FIG. 4*a*. The direct translation action of the modulator-amplifier 41 is then effective to feed these components through to the output of the modulator-amplifier 41. At the same time, the heterodyning action is effective to regenerate the missing side band of such signal, in this case the upper side band $S_2$, as well as an additional carrier component C. These heterodyne-conversion components are shown on the frequency spectrum graph of FIG. 4*b*. By combining these signal components, either in a signal-combining circuit as represented by unit 48 of FIG. 3*a* or by a common load circuit as represented by the load resistor 51 of FIG. 3*b*, there is produced a complete double-side-band signal having both a lower side band $S_1$ and an upper side band $S_2$. For the case of a more complex type of signal modulation on the carrier, a corresponding upper side-band component is developed in a similar manner for each frequency component of the lower side-band modulation components. As a result, the input vestigial-side-band signal is converted into a complete wide band double-side-band signal which may then be detected by the envelope detector 16 with a minimum of signal distortion.

The heterodyne conversion is accurately controlled by the locally derived signal which is developed by the tuned circuit 40. To this end, the tuned circuit 40 should have a narrow pass band for responding to substantially only the double-side-band portion of the original vestigial-side-band signal supplied to the input terminal 42 of the modulator-amplifier 41. Because the phase of such original double-side-band portion is relatively constant, the locally derived signal has a correspondingly constant phase and may, therefore, be used to control the operation of the modulator-amplifier 41. In the case of a modulator-amplifier of the type shown in FIG. 3*a*, the locally derived signal may be utilized to control the translation, that is, the heterodyne conversion of only the single-side-band portion of the vestigial-side-band signal. Where a circuit of the type shown in FIG. 3*b* is utilized, such locally derived signal is utilized to control the translation of both the single side-band and double-side-band portions of the original vestigial-side-band signal.

The regeneration of the missing side-band components occurs as a result of the heterodyning action between the single-side-band components supplied to the input terminal 42 and the locally derived second harmonic signal supplied by way of the terminal 44. Such heterodyning action follows the usual heterodyne theory, producing both sum-frequency and difference-frequency heterodyne components. The difference-frequency component represents the missing side band of the corresponding single-side-band input component. This phenomenon may be demonstrated mathematically by means of a simplified mathematical proof which will now be set forth. This derivation is not intended to be a rigorous explanation of what occurs in the case of an actual television transmission system because several additional considerations such as the effect of negative modulation and the frequency conversion in the frequency converter 13, which are not essential to the present discussion, have been omitted therefrom. Rather, what is intended is a simplified demonstration that the heterodyning of a single-side-band carrier component with a signal which is the second harmonic of the carrier frequency is effective to generate the mating side band.

To this end, a carrier signal modulated by a single sinusoidal signal may be represented by the following expression:

$$E_{DSB}=(E_c+a\cos\omega_a t)\cos\omega_c t \qquad (1)$$

where $E_{DSB}$=double-side-band modulated carrier
$E_c$=peak carrier amplitude
$\omega_c$=carrier angular frequency
$a$=peak amplitude of modulation envelope
$\omega_a$=modulating signal angular frequency.

By means of trigonometric identity, this may be expanded in terms of sum-frequency and difference-frequency components as represented by the following expression:

$$E_{DSB}=E_c\cos\omega_c t+\tfrac{1}{2}a\cos(\omega_c t-\omega_a t)+\tfrac{1}{2}a\cos(\omega_c t+\omega_a t) \qquad (2)$$

Figure 5A:
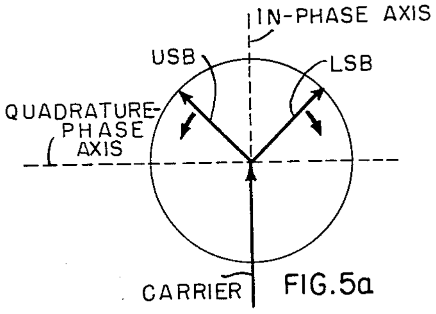

A vector diagram representing the various terms of Equation 2 is shown in FIG 5*a* wherein the carrier vector represents the first or carrier term while the lower side-band vector LSB represents the second term containing the minus sign and the upper side-band vector USB represents the third term containing the plus sign. As is indicated, the side-band vectors are rotating relative to the carrier vector. In the case of the lower side-band component for example, this is due to the fact that the frequency of such component is lower than the carrier frequency and, hence, such component is continually falling back in phase relative to the carrier phase.

In the case of vestigial-side-band transmission, one of the side-band components, for example, the upper side-band component does not appear at the output of the intermediate-frequency amplifier 14. Accordingly, the corresponding signal represents a single-side-band modulated carrier $E_{SSB}$ and may be represented by the following expression:

$$E_{SSB}=E_c\cos\omega_c t+\tfrac{1}{2}a\cos(\omega_c t-\omega_a t) \qquad (3)$$

Figure 5B:
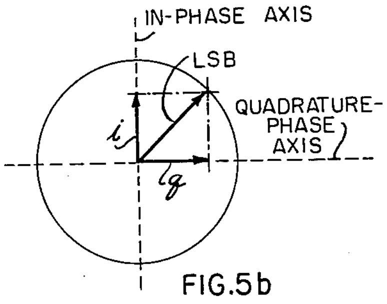

The lower side-band term may be represented vectorially by the vector LSB of FIG. 5*b*.

The heterodyning action in the modulator-amplifier 41 serves to multiply this single-side-band signal with a signal $E_2$ having a frequency which is twice the intermediate-frequency carrier frequency to produce a heterodyne-conversion output component $E_H$ represented by the following expression:

$$E_H=E_{SSB}E_2 \qquad (4)$$

The second harmonic locally derived signal $E_2$ may be represented by the following expression:

$$E_2=2m\cos(2\omega_c t+\theta) \qquad (5)$$

where $2m$=peak amplitude of second harmonic signal
$\theta$=static phase shift of second harmonic.

Substituting Equations 3 and 5 into Equation 4 and carrying out the indicated multiplication, it may be shown that for each term of Equation 3 there is developed a sum-frequency term, which is a third harmonic term, and a difference-frequency term, which is a fundamental frequency term. The third harmonic terms are suppressed by the band-pass filter 52 so that the resulting heterodyne-conversion components correspond to the fundamental terms which may be represented by the following expression:

$$E_H=mE_c\cos(\omega_c t+\theta)+\tfrac{1}{2}ma\cos(\omega_c t+\omega_a t+\theta) \qquad (6)$$

Assuming for the moment that the amplitude factor "*m*" of the second harmonic is unity and the static phase shift $\theta$ is zero, then Equation 6 reduces to the following expression:

$$E_H=E_c\cos\omega_c t+\tfrac{1}{2}a\cos(\omega_c t+\omega_a t) \qquad (7)$$

Figure 5C:
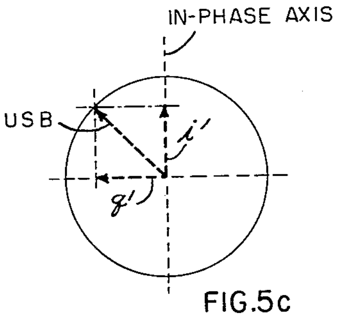

The important consideration regarding the heterodyne components represented by Equation 7 is that the second or single-side-band term contains a plus sign and, hence, represents the upper side-band component USB as shown in FIG. 5*c*.

There thus results at the output of the modulator-amplifier 41 a direct feed-through component corresponding to the lower side-band and carrier components of Equation 3 and a heterodyne-conversion component corresponding to the upper side-band and carrier components represented by Equation 7. These two sets of components are related in a frequency sense as shown by the spectrum graphs of FIGS. 4*a* and 4*b*. A corresponding derivation may be performed for each frequency component of a carrier signal having a more complex type of modulation so that it can be shown that the same general conclusions hold for such signal. With regard to modulation components which are transmitted in a double-side-band manner, a consideration of the effect of the signal-converting apparatus 15 thereon may be obtained by considering each of the side-band components separately. In other words, the heterodyne conversion produces an additional upper side-band component for each lower side-band component and an additional lower side-band component for each upper side-band component, the net effect being that the amplitude of the double side-band portion of the signal is doubled. The over-all amplitude relationships are preserved, however, because the modulation components originally transmitted in a single-side-band manner are also effectively doubled due to the generation of the mating side bands.

In obtaining Equation 7, it was assumed that the static phase shift $\theta$ of the locally derived second harmonic signal was equal to zero. In practice, this is actually a necessary condition in order to obtain the desired results. In other words, the phase of the second harmonic signal as applied to the modulating elements of the modulator-amplifier 41 must be in phase with the phase of the intermediate-frequency carrier. Otherwise, the heterodyne-conversion components are undesirably distorted.

Figure 5D:
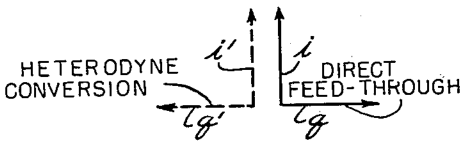

For convenience of explanation it is desirable to resolve each of the upper and lower side-band components into a pair of in-phase and quadrature components lying along the in-phase and quadrature-phase carrier axes, respectively. Such components are represented by the "*i*" and "*q*" quantities of FIGS. 5*b* and 5*c*. In this manner, the results of the modulator-amplifier 41 operation may be summarized by considering only the individual quadrature components as shown in FIG. 5*d*. When this is done, it will be seen that the quadrature components $q$ and $q'$ are equal in amplitude and opposite in phase so that such components cancel one another and, hence, do not appear in the detected signal.

Frequency-wise, the signal conversion just described is complete, that is, for each of the original single-side-band components there is developed a mating side band. Amplitude-wise, however, the side-band matching may in some cases be somewhat imperfect. This occurs, for example, where the mating upper side band is different in amplitude from the amplitude of the corresponding lower side band at the output of the modulator-amplifier 41. In this case, the magnitude of the heterodyne-conversion vectors $i'$ and $q'$ in FIG. 5*d* would be less than the magitude of the direct feed-through vectors $i$ and $q$. In such a case, it is apparent that there is incomplete cancellation of the quadrature components. It is equally clear, however, that any resulting quadrature component will be less than would have been the case had no mating side band whatsoever been generated. Thus, the case of imperfect sideband matching may nevertheless lead to a substantial reduction in the amounts of signal distortion appearing at the output of the detector circuit.

Where separate signal channels are used in the amplifier-modulator as shown in FIG. 3*a*, the gains of the two channels may be adjusted to give substantially perfect sideband matching. In the case of a single channel modulator-amplifier as shown in FIG. 3*b*, the adjustment is not quite so easy. In this case, the amplitude of the direct feed-through components is controlled by the average gain or transconductance of the modulator-amplifier tube 50. This gain may be adjusted by properly selecting the region of the tube characteristic over which the tube 50 is to operate. The gain for the heterodyne-conversion components also depends on the region of the tube characteristic to be utilized but, in addition, is affected by the wave form of the anode-current flow within the tube. In addition, as indicated by Equation 6, the heterodyne-conversion amplitude is also dependent on the peak amplitude of the locally derived signal. By suitably selecting these factors, it is possible with a relatively simple modulator-amplifier like that shown in FIG. 3*b* to obtain a substantial reduction in signal distortion. For example, it has been found that for the case of one hundred percent modulation, where the conversion gain is one-half of the direct feed-through gain, the signal distortion is reduced by a factor of 19 decibels.

As mentioned, the heterodyne-conversion gain may be dependent on the amplitude of the locally derived second harmonic signal as indicated by the "*m*" factor of Equation 6. It is, however, not desirable to have such gain dependent on the signal strength of the received carrier signal as such signal strength is subject to variations and such variations would undesirably modulate the gain of the heterodyne-conversion components. Accordingly, the second harmonic amplitude supplied to the modulating elements of the modulator-amplifier 41 should be as nearly independent of the received carrier amplitude as possible. One way to ensure this result is to use grid-limiting action at the tube electrode to which the second harmonic signal is supplied. Another way would be to use automatic-gain-control action, for example, by using the direct-current output of the detector diode 16 to control the gain of the modulator-amplifier 41.

*Modulator-amplifier apparatus of FIG. 6*

Referring now to FIG. 6 of the drawings, there is represented another embodiment of modulator-amplifier apparatus **41*c* which may be used in place of the modulator-amplifier 41 of FIG. 1. The apparatus of FIG. 6 enables attainment of perfect side-band matching in an amplitude sense as well as complete side-band matching in a frequency sense. In other words, the apparatus of FIG. 6 operates so that substantially no quadrature components appear at the output terminal 43** thereof.

To this end, the apparatus of FIG. 6 includes first modulator-amplifier circuit means 60 for directly translating and for heterodyning the amplitude-modulated carrier signal with a locally derived signal for developing a first signal having both carrier-phase and quadrature-phase components. The apparatus of FIG. 6 also includes second modulator-amplifier circuit means 61 for directly translating and for heterodyning the amplitude-modulated carrier signal with a phase-shifted replica of the locally derived signal for developing a second signal also having both carrier-phase and quadrature-phase components. To obtain the desired phase shift of the locally derived signal which is supplied to the second modulator-amplifier 61, such signal is passed through, for example, a phase inverter 62 which serves to reverse the polarity of the signal.

By way of the signal terminal 44, the apparatus of FIG. 6 is coupled to the circuit means represented, for example, by the tuned circuit 40 of FIG. 1 which is responsive to the double-side-band portion of the original amplitude-modulated carrier signal for deriving the local signal which is supplied to the modulator-amplifier circuits.

The apparatus of FIG. 6 also includes circuit means coupled to the outputs of the modulator-amplifier circuits 60 and 61 for combining the first and second signals so that the quadrature-phase components cancel to provide substantially a complete double-side-band amplitude-modulated carrier signal having substantially no quadrature components and which may, therefore, be detected with a minimum of signal distortion. Such combining circuit means may include a signal-combining circuit 63, coupled to the output of the first modulator-amplifier 60, and a phase inverter 64 for coupling the second modulator-amplifier 61 to the signal-combining circuit 63. The signal-combining circuit 63 may take the form of, for example, a resistor adding circuit which is proportioned so that the reversed polarity quadrature component supplied by way of the phase inverter 64 is combined with the quadrature component from the modulator-amplifier 60 in such proportion as to cancel such component.

Each of the modulator-amplifier circuits 60 and 61 may, for example, take the form of either of the modulator-amplifier circuits shown in FIGS. 3*a* and 3*b*. As before, each modulator-amplifier is effective to directly translate a portion of the input signal. In addition, each modulator-amplifier heterodynes a portion of the input signal with a locally derived signal which may be, for example, a second harmonic signal for producing the mating side bands for the corresponding side-band components of the input signal. In each case, the original and the mating side bands are combined to produce what in a frequency-wise sense is a complete double-side-band signal.

To understand the manner in which the amplitude imperfection is overcome, it will be assumed that the direct feed-through components at the output of the first modulator-amplifier 60 are of approximately twice the amplitude of the heterodyne-conversion components. This situation is represented vectorially in FIG. 7*a* where each type of component is resolved into the corresponding in-phase and quadrature-phase components. Vector addition of the in-phase and quadrature-phase components of FIG. 7*a* produces a resultant output signal for the modulator-amplifier 60 as shown in FIG. 7*b*. The modulator-amplifier 60 is termed an in-phase unit because the output signal thereof is composed primarily of components which lie along the in-phase carrier axis.

Each of the direct feed-through and corresponding heterodyne-conversion components appearing at the output of the modulator-amplifier 61 may be represented vectorially as shown in FIG. 7*c*. In this case, the heterodyne-conversion components $i_2'$ and $q_2'$ are of opposite polarity to the corresponding components of FIG. 7*a* due to the reverse polarity of the locally derived signal supplied to the modulator-amplifier 61. These in-phase and quadrature-phase components of FIG. 7*c* add to produce resultant in-phase and quadrature-phase components as shown in FIG. 7*d*. It thus appears that the modulator-amplifier 61 output signal is composed primarily of the quadrature-phase components. This resultant signal for the modulator-amplifier 61 is then supplied to the phase inverter 64 to thereby produce the reverse polarity components shown in FIG. 7*e*. These reverse polarity components are then combined in the proper proportion with the resultant signal from the modulator-amplifier 60 so that the quadrature components $q_1$ and $-kq_2$ cancel. In this manner, the side-band matching is perfect in the sense that no quadrature components are present at the output terminal 43. As is apparent in FIG. 7*f*, however, a slight reduction is suffered in the amplitude of the in-phase component $i_1$ due to the opposite polarity component $-ki_2$. This slight reduction of the output signal amplitude is more than compensated for by the benefits which accrue because of the elimination of the quadrature components.

*Signal-converting apparatus of FIG. 8*

Referring now to FIG. 8 of the drawings, there is shown a practical and convenient form of apparatus for operating in accordance with the principles of the FIG. 6 apparatus. For clarity of understanding, the apparatus of FIG. 8 corresponds to all of the FIG. 1 apparatus appearing between the input terminal 42 of the modulator-amplifier and the output terminal 17*a* of the detector circuit low-pass filter 17. In other words, the envelope detector 16 and low-pass filter 17 of FIG. 1 have been repeated in FIG. 8 to better show the interconnection with the signal-converting apparatus of FIG. 8.

The apparatus of FIG. 8 includes a beam-deflection electron-discharge device 70 including a control electrode 71, a pair of anodes 72 and 73, and beam-deflection electrodes 74 and 75 for deflecting the electron beam back and forth between the anodes 72 and 73. The beam-deflection tube 70 may also include a cathode 76, a focusing electrode 77, and an accelerating electrode 78. Such beam-deflection tube may be of the 6AR8 type which is described in considerable detail in an article entitled, "Beam-Deflection Tube Simplifies Color Decoders," by Adler and Heuer which appears at page 148 of the May 1954 issue of Electronics.

The apparatus of FIG. 8 also includes circuit means such as, for example, the input terminal 42 for supplying the vestigial-side-band amplitude-modulated carrier signal to the control electrode 71 of the beam-deflection tube 70. The terminal 42 may be connected to such control electrode 71 by way of a coupling condenser 80 and grid-leak resistor 81.

The apparatus of FIG. 8 further includes circuit means responsive to the double-side-band portion of the amplitude-modulated carrier signal for deriving a local heterodyning signal which is applied between the beam-deflection electrodes 74 and 75 for modulating current flow to the anodes 72 and 73 to develop at the anodes 72 and 73 additional signal components representative of the missing side-band components of the amplitude-modulated carrier signal. Such circuit means may include a tuned circuit 82 having a condenser 83 and an inductor 84 which are tuned, for example, to the second harmonic of the carrier frequency. The tuned circuit 82 may be coupled to the deflection electrode 74 by way of a direct-current blocking condenser 85. Also, as shown, the tuned circuit 82 may be coupled to the output of the detector diode 16 by way of a transformer winding 86. Also, the winding 86 and condenser 19 may be proportioned to be series-resonant at the second harmonic of the carrier frequency.

The apparatus of FIG. 8 also includes circuit means coupled to the anodes 72 and 73 for combining the anode output signals so that the quadrature-phase components cancel to provide substantially a complete double-side-band amplitude-modulated carrier signal. Such circuit means may include a pair of transformer windings 88 and 89, one of which is coupled to one anode 72 and the other of which is coupled to the other anode 73. The polarity of the transformer windings 88 and 89 and the coefficient of coupling therebetween are proportioned so that the quadrature-phase components at the anodes 72 and 73 cancel one another. The winding 89 also serves as part of a tuned circuit 90 which also includes a condenser 91 and a damping resistor 92. The tuned circuit 90 constitutes a band-pass filter corresponding to the filter 52 of FIG. 1 for suppressing high order harmonics resulting from the heterodyning process. The signal at the anode 72 is developed across a load inductor 93 and supplied to the tuned circuit 90 by way of a coupling condenser 94. The resultant signal across the tuned circuit 90 is, in turn, supplied to the detector diode 16 and the low-pass filter 17 to develop at the output terminal 17*a* the desired video signal having a minimum of signal distortion.

Figure 7F:
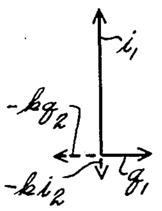

In operation, each half of the beam-deflection tube 70 corresponds to one of the modulator-amplifier units 60 and 61 of FIG. 6. In particular, the half including the anode 72 corresponds to the modulator-amplifier 60 while the half which includes the other anode 73 corresponds to the modulator-amplifier 61. The proper polarity inversion of the locally derived signal across the tuned circuit 82 is obtained by applying the signal to the deflection electrodes 74 and 75 in the indicated push-pull manner. The current flow to each anode is modulated by this locally derived signal because of the fact that such signal controls or modulates the proportion of current reaching the respective anodes at any given moment of time. As a result, the signal components produced at the anode 72 may be represented vectorially by the vectors of FIG. 7*b* while the corresponding components at the anode 73 may be represented vectorially by the vectors of FIG. 7*d*. The polarity of the signal at the anode 73 is reversed by the transformer windings 88 and 89. Also, the proportion of such signal, which is combined with the first signal from the anode 72 by the tuned circuit 90, is controlled by adjusting the coefficient of coupling between the transformer windings 88 and 89 to obtain cancellation of the quadrature components as shown in FIG. 7*f*.

The average or direct feed-through gain of the beam-deflection tube 70 may be conveniently adjusted by adjusting the differential bias between the deflection electrodes 74 and 75. To this end, the bias for the electrode 75 is selected by suitably adjusting the ratio of cathode resistors 95 and 96 which for signal frequencies are by-passed by a condenser 97. The differential bias between the deflection electrodes is then obtained by adjusting the ratio of the voltage-dividing resistors 98 and 99 which determine the bias potential supplied to the deflection electrode 74. In this manner, the average or direct feed-through gain of the modulator-amplifier section, represented by the anode 72 half of the tube 70, may be adjusted to a desired value such that the quadrature components appearing at anode 72 are minimized.

Also, the heterodyne-conversion gain should not be affected by variations in signal strength of the received carrier signal. As mentioned, such variations may be prevented by making the amplitude of the locally derived second harmonic signal as applied to the modulating elements independent of the received signal strength or by making the effective modulation in tube 70 independent of such received signal strength. One way to obtain this result is to obtain limiting action in the tube 70 by overdriving the deflection electrodes 74 and 75. Another way would be to utilize automatic-gain-control action by, for example, using the direct-current output of the detector diode 16 to control the bias on the deflection electrode 74.

CONCLUSIONS

From the foregoing descriptions of the various embodiments of the invention, it will be apparent that signal-converting apparatus constructed in accordance with the present invention represents new and improved apparatus for converting a vestigial-side-band carrier signal into a complete wide band double-side-band carrier signal. As a result, such apparatus may be utilized in a vestigial-side-band receiver to minimize the signal distortion which would otherwise occur when envelope-detecting a vestigial-side-band carrier signal. In the case of a television receiver, the reduction of such signal distortion results in a substantial improvement in the quality of the reproduced television image.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for converting a vestigial-side-band amplitude-modulated carrier signal into a double-side-band amplitude-modulated carrier signal, the apparatus comprising: circuit means responsive to the double-side-band portion of the amplitude-modulated carrier signal for deriving a signal having a phase representative of the carrier phase; and circuit means for translating the amplitude-modulated carrier signal and responsive to said derived signal for controlling the translation of at least the single-side-band portion of the amplitude-modulated carrier signal for producing mating side bands for the single-side-band portion to give substantially a complete double-side-band amplitude-modulated carrier signal.

2. Receiver apparatus for detecting a vestigial-side-band amplitude-modulated carrier signal with a minimum of signal distortion, the apparatus comprising: circuit means for supplying a vestigial-side-band amplitude-modulated carrier signal; circuit means responsive to the double-side-band portion of the amplitude-modulated carrier signal for deriving a signal having a phase representative of the carrier phase; circuit means for translating the amplitude-modulated carrier signal and responsive to said derived signal for controlling the translation of at least the single-side-band portion of the amplitude-modulated carrier signal for producing mating side bands for the single-side-band portion to give substantially a complete double-side-band amplitude-modulated carrier signal; and an envelope detector circuit for detecting the complete double-side-band signal, thereby to provide a detected signal having a minimum of signal distortion.

3. Receiver apparatus for detecting a vestigial-side-band amplitude-modulated carrier signal with a minimum of signal distortion, the apparatus comprising: circuit means for supplying an intermediate-frequency vestigial-side-band amplitude-modulated carrier signal; circuit means responsive to the double-side-band portion of the intermediate-frequency carrier signal for deriving a signal having a phase representative of the intermediate-frequency carrier phase; circuit means for translating the amplified intermediate-frequency carrier signal and responsive to said derived signal for controlling the translation of at least the single-side-band portion of the carrier signal for producing mating side bands for the single-side-band portion to give substantially a complete double-side-band amplitude-modulated carrier signal; and an envelope detector circuit for detecting the complete double-side-band signal, thereby to provide a detected signal having a minimum of signal distortion.

4. Apparatus for converting a vestigial-side-band amplitude-modulated carrier signal into a double-side-band amplitude-modulated carrier signal, the apparatus comprising: a modulator-amplifier circuit for directly translating and for heterodyning the amplitude-modulated carrier signal with a locally derived signal for developing, in addition to the original signal components, heterodyne components representative of the missing side-band components of the amplitude-modulated carrier signal; circuit means responsive to the double-side-band portion of the amplitude-modulated carrier signal for deriving said local signal which is supplied to the modulator-amplifier circuit; and band-pass filter circuit means coupled to the output of the modulator-amplifier circuit for translating the modulator-amplifier output components which constitute substantially a complete double-side-band amplitude-modulated carrier signal.

5. Apparatus for minimizing the signal distortion which otherwise occurs when detecting a vestigial-side-band amplitude-modulated carrier signal, the apparatus comprising: a modulator-amplifier circuit for directly translating a portion of the amplitude-modulated carrier signal and for simultaneously heterodyning a portion of the amplitude-modulated carrier signal with a locally derived signal for developing, in addition to the original signal components, heterodyne components representative of the missing side-band components of the amplitude-modulated carrier signal; circuit means responsive to the double-side-band portion of the amplitude-modulated carrier signal for deriving said local signal which is supplied to the modulator-amplifier circuit; and band-pass filter circuit means coupled to the output of the modulator-amplifier circuit for translating the modulator-amplifier output components which constitute substantially a complete double-side-band amplitude-modulated carrier signal which may be detected with a minimum of signal distortion.

6. Apparatus for minimizing the signal distortion which otherwise occurs when detecting a vestigial-side-band amplitude-modulated carrier signal, the apparatus comprising: an unbalanced modulator circuit for directly translating and for heterodyning the amplitude-modulated carrier signal with a locally derived signal for developing, in addition to the original signal components, heterodyne components representative of the missing side-band components of the amplitude-modulated carrier signal; circuit means responsive to the double-side-band portion of the amplitude-modulated carrier signal for deriving said local signal which is supplied to the unbalanced modulator circuit; and band-pass filter circuit means coupled to the output of the unbalanced modulator circuit for translating the unbalanced modulator output components which constitute substantially a complete double-side-band amplitude-modulated carrier signal which may be detected with a minimum of signal distortion.

7. Apparatus for minimizing the signal distortion which otherwise occurs when detecting a vestigial-side-band amplitude-modulated carrier signal, the apparatus comprising: a modulator-amplifier circuit including an amplifier circuit connected in parallel with a balanced modulator circuit for directly translating and for heterodyning the amplitude-modulated carrier signal with a locally derived signal for developing, in addition to the original signal components, heterodyne components representative of the missing side-band components of the amplitude-modulated carrier signal; circuit means responsive to the double-side-band portion of the amplitude-modulated carrier signal for deriving said local signal which is supplied to the modulator-amplifier circuit; and band-pass filter circuit means coupled to the output of the modulator-amplifier circuit for translating the modulator-amplifier output components which constitute substantially a complete double-side-band amplitude-modulated carrier signal which may be detected with a minimum of signal distortion.

8. Apparatus for minimizing the signal distortion which otherwise occurs when detecting a vestigial-side-band amplitude-modulated carrier signal, the apparatus comprising: a modulator-amplifier circuit for directly translating and for heterodyning the amplitude-modulated carrier signal with a locally derived signal having a frequency which is a harmonic of the carrier frequency for developing, in addition to the original signal components, heterodyne components representative of the missing side-band components of the amplitude-modulated carrier signal; circuit means tuned to a harmonic of the carrier frequency and responsive to the double-side-band portion of the amplitude-modulated carrier signal for deriving said local signal which is supplied to the modulator-amplifier circuit; and band-pass filter circuit means coupled to the output of the modulator-amplifier circuit for translating the modulator-amplifier output components which constitute substantially a complete double-side-band amplitude-modulated carrier signal which may be detected with a minimum of signal distortion.

9. Apparatus for minimizing the signal distortion which otherwise occurs when detecting a vestigial-side-band amplitude-modulated carrier signal, the apparatus comprising: a modulator-amplifier circuit for directly translating and for heterodyning the amplitude-modulated carrier signal with a locally derived signal having a frequency which is the second harmonic of the carrier frequency for developing, in addition to the original signal components, heterodyne components representative of the missing side-band components of the amplitude-modulated carrier signal; a tuned circuit which is tuned to the second harmonic of the carrier frequency and is responsive to the double-side-band portion of the amplitude-modulated carrier signal for deriving said local signal which is supplied to the modulator-amplifier circuit; and band-pass filter circuit means coupled to the output of the modulator-amplifier circuit for translating the modulator-amplifier output components which constitute substantially a complete double-side-band amplitude-modulated carrier signal which may be detected with a minimum of signal distortion.

10. Receiver apparatus for detecting a vestigial-side-band amplitude-modulated carrier signal with a minimum of signal distortion, the apparatus comprising: circuit means for supplying a vestigial-side-band amplitude-modulated carrier signal; a modulator-amplifier circuit for directly translating and for heterodyning the amplitude-modulated carrier signal with a locally derived signal for developing, in addition to the original signal components, heterodyne components representative of the missing side-band components of the amplitude-modulated carrier signal; band-pass filter circuit means coupled to the output of the modulator-amplifier circuit for translating the modulator-amplifier output components which constitute substantially a complete double-side-band amplitude-modulated carrier signal; an envelope detector circuit for detecting the complete double-side-band signal to provide a detected signal having a minimum of signal distortion; and circuit means responsive to the rectified signal in the detector circuit for deriving said local signal which is supplied to the modulator-amplifier circuit.

11. Receiver apparatus for detecting a vestigial-side-band amplitude-modulated carrier signal with a minimum of signal distortion, the apparatus comprising: circuit means for supplying a vestigial-side-band amplitude-modulated carrier signal; a modulator-amplifier circuit for directly translating and for heterodyning the amplitude-modulated carrier signal with a locally derived signal having a frequency which is the second harmonic of the carrier frequency and a phase which corresponds to the carrier phase for developing, in addition to the original signal components, heterodyne components representative of the missing side-band components of the amplitude-modulated carrier signal; band-pass filter circuit means coupled to the output of the modulator-amplifier circuit for translating the modulator-amplifier output components which constitute substantially a complete double-side-band amplitude-modulated carrier signal; an envelope detector circuit for detecting the complete double-side-band signal to provide a detected signal having a minimum of signal distortion; and a tuned circuit which is tuned to the second harmonic of the carrier frequency and is responsive to the rectified signal in the detector circuit for deriving said local signal which is supplied to the modulator-amplifier circuit.

12. Apparatus for minimizing the signal distortion which otherwise occur when detecting a vestigial-side-band amplitude-modulated carrier signal, the apparatus comprising: first modulator-amplifier circuit means for directly translating and for heterodyning the amplitude-modulated carrier signal with a locally derived signal for developing a first signal having both carrier-phase and quadrature-phase components; second modulator-amplifier circuit means for directly translating and for heterodyning the amplitude-modulated carrier signal with a phase-shifted replica of the locally derived signal for developing a second signal having both carrier-phase and quadrature-phase components; circuit means responsive to the double-side-band portion of the amplitude-modulated carrier signal for deriving said local signal which is supplied to the modulator-amplifier circuits; and circuit means coupled to the outputs of the modulator-amplifier circuits for combining said first and second signals so that the quadrature-phase components cancel to provide substantially a complete double-side-band amplitude-modulated carrier signal having substantially no quadrature components and which may, therefore, be detected with a minimum of signal distortion.

13. Apparatus for minimizing the signal distortion which otherwise occurs when detecting a vestigial-side-band amplitude-modulated carrier signal, the apparatus comprising: first modulator-amplifier circuit means for directly translating and for heterodyning the amplitude-modulated carrier signal with a locally derived signal having a frequency which is the second harmonic of the carrier frequency and a phase which corresponds to the carrier phase for developing a first signal having both carrier-phase and quadrature-phase components; second modulator-amplifier circuit means for directly translating and for heterodyning the amplitude-modulated carrier signal with a phase-inverted replica of the locally derived signal for developing a second signal having both carrier-phase and quadrature-phase components; a tuned circuit which is tuned to the second harmonic of the carrier frequency and is responsive to the double-side-band portion of the amplitude-modulated carrier signal for deriving said local signal which is supplied to the modulator-amplifier circuits; and circuit means coupled to the outputs of the modulator-amplifier circuits for combining said first and second signals so that the quadrature-phase components cancel to provide substantially a complete double-side-band amplitude-modulated carrier signal having substantially no quadrature components and which may, therefore, be detected with a minimum of signal distortion.

14. Apparatus for minimizing the signal distortion which otherwise occurs when detecting a vestigial-side-band amplitude-modulated carrier signal, the apparatus comprising: a beam-deflection electron-discharge device including a control electrode, a pair of anodes, and beam-deflection electrodes for deflecting the electron beam back and forth between the anodes; circuit means for supplying the vestigial-side-band amplitude-modulated carrier signal to the control electrode; circuit means responsive to the double-side-band portion of the amplitude-modulated carrier signal for deriving a local heterodyning signal which is applied between the beam-deflection electrodes for modulating current flow to the anodes to develop at the anodes additional signal components representative of the missing side-band components of the amplitude-modulated carrier signal; and circuit means coupled to the anodes for combining the anode output signals so that the quadrature-phase components cancel to provide substantially a complete double-side-band amplitude-modulated carrier signal having substantially no quadrature components and which may, therefore, be detected with a minimum of signal distortion.

15. Apparatus for minimizing the signal distortion which otherwise occurs when detecting a vestigial-side-band amplitude-modulated carrier signal, the apparatus comprising: a beam-deflection electron-discharge device including a control electrode, a pair of anodes, and beam-deflection electrodes for deflecting the electron beam back and forth between the anodes; circuit means for supplying the vestigial-side-band amplitude-modulated carrier signal to the control electrode; a tuned circuit which is tuned to the second harmonic of the carrier frequency and is responsive to the double-side-band portion of the amplitude-modulated carrier signal for deriving a second harmonic heterodyning signal which is applied between the beam-deflection electrodes for modulating current flow to the anodes to develop at the anodes additional signal components representative of the missing side-band components of the amplitude-modulated carrier signal; and circuit means coupled to the anodes for combining the anode output signals so that the quadrature-phase components cancel to provide substantially a complete double-side-band amplitude-modulated carrier signal having substantially no quadrature components and which may, therefore, be detected with a minimum of signal distortion.

16. Receiver apparatus for detecting a vestigial-side-band amplitude-moduated carrier signal with a minimum of signal distortion, the apparatus comprising: a beam-deflection electron-discharge device including a control electrode, a pair of anodes, and beam-deflection electrodes for deflecting the electron beam back and forth between the anodes; circuit means for supplying the vestigial-side-band amplitude-modulated carrier signal to the control electrode; a tuned circuit which is tuned to the second harmonic of the carrier frequency and is responsive to the double-side-band portion of the amplitude-modulated carrier signal for deriving a second harmonic heterodyning signal which is applied between the beam-deflection electrodes for modulating current flow to the anodes to develop at the anodes additional signal components representative of the missing side-band components of the amplitude-modulated carrier signal; a pair of transformer windings, one being coupled to one anode and one to the other anode, the polarity of the windings and the coefficient of coupling therebetween being such that the anode output signals are combined so that the quadrature-phase components cancel to provide substantially a complete double-side-band amplitude-modulated carrier signal having substantially no quadrature components; and an envelope detector circuit for detecting the complete double-side-band signal to provide a detected signal having a minimum of signal distortion; the tuned circuit for deriving the second harmonic heterodyning signal being coupled to the detector circuit and energized by the rectified signal components corresponding to the double-side-band portion of the original vestigial-side-band carrier signal.

References Cited in the file of this patent

UNITED STATES PATENTS

| | | |
|---|---|---|
| 2,108,117 | Gardere et al. | Feb. 15, 1938 |
| 2,280,187 | Case | Apr. 21, 1942 |
| 2,394,544 | Gottier | Feb. 12, 1946 |
| 2,653,221 | Carnahan | Sept. 22, 1953 |
| 2,681,988 | Oliver | June 22, 1954 |
| 2,754,356 | Espenlaub | July 10, 1956 |
| 2,779,818 | Adler et al. | Jan. 29, 1957 |
| 2,784,311 | Kahn | Mar. 5, 1957 |

FOREIGN PATENTS

| | | |
|---|---|---|
| 537,378 | Great Britain | June 19, 1941 |